(12) United States Patent
Barger

(10) Patent No.: US 8,118,293 B1
(45) Date of Patent: Feb. 21, 2012

(54) MULTI-AXIS CYLINDER MANIPULATOR

(75) Inventor: Brian Blair Barger, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 485 days.

(21) Appl. No.: 12/383,089

(22) Filed: Mar. 18, 2009

(51) Int. Cl.
*B23Q 3/00* (2006.01)
*B23Q 3/18* (2006.01)
*B25B 1/00* (2006.01)
*B25B 27/14* (2006.01)
*B21G 7/08* (2006.01)
*B25H 1/00* (2006.01)
*A47F 5/12* (2006.01)

(52) U.S. Cl. ............ 269/289 MR; 269/289 R; 269/55; 269/60; 29/281.1; 29/5; 144/287; 248/133

(58) Field of Classification Search .............. 269/289 R, 269/289, 55, 60; 29/281.1, 281, 5; 144/287; 414/223.01
See application file for complete search history.

(56) References Cited

U.S. PATENT DOCUMENTS

| | | | | |
|---|---|---|---|---|
| 2,888,127 A * | 5/1959 | Uhlig | ............................ | 198/379 |
| 4,365,339 A | 12/1982 | Pavkovich et al. | | |
| 4,397,054 A * | 8/1983 | Lee, Jr. | ............................ | 82/164 |
| 4,412,401 A * | 11/1983 | Fundell | .......................... | 451/242 |
| 4,417,149 A * | 11/1983 | Takeuchi et al. | ......... | 250/559.46 |
| 4,625,854 A * | 12/1986 | Deichmann et al. | .......... | 198/416 |
| 4,629,389 A * | 12/1986 | Kontz | ............................ | 414/433 |
| 4,664,579 A * | 5/1987 | Schedwin | ............... | 414/223.01 |
| 4,787,505 A * | 11/1988 | Tweedy | .................... | 198/867.08 |
| 5,474,166 A * | 12/1995 | Santandrea et al. | ........ | 198/345.3 |
| 5,697,411 A * | 12/1997 | Vandaele | ...................... | 144/287 |
| 7,065,175 B2 | 6/2006 | Green | | |
| 7,207,555 B2 * | 4/2007 | Valentin et al. | ......... | 269/289 MR |
| 7,350,309 B2 * | 4/2008 | Hermann et al. | ............... | 33/520 |
| 7,779,524 B2 * | 8/2010 | Campian | .................... | 29/243.58 |

\* cited by examiner

*Primary Examiner* — Lee D Wilson
*Assistant Examiner* — Alvin Grant
(74) *Attorney, Agent, or Firm* — Fredric J. Zimmerman

(57) ABSTRACT

An apparatus and method for both rotating a cylinder about its center axis and translating the cylinder linearly along the same axis. The invention is suitable for X-raying rockets and other cylindrical objects. Multi-axis movement is accomplished by two sets of rollers: rotational and translational. The translational roller set is held in a retracted and unengaged position while the cylinder rests on the rotational roller set. Movement about the axis of the rotational roller set is allowed. When the translational roller set is engaged with the cylinder, the cylinder is disengaged from the rotational roller set, and movement about the axis is not allowed, but linear movement is allowed. The action may be reversed and repeated. The rollers or the cylinder may be powered by motor or manual device.

21 Claims, 4 Drawing Sheets

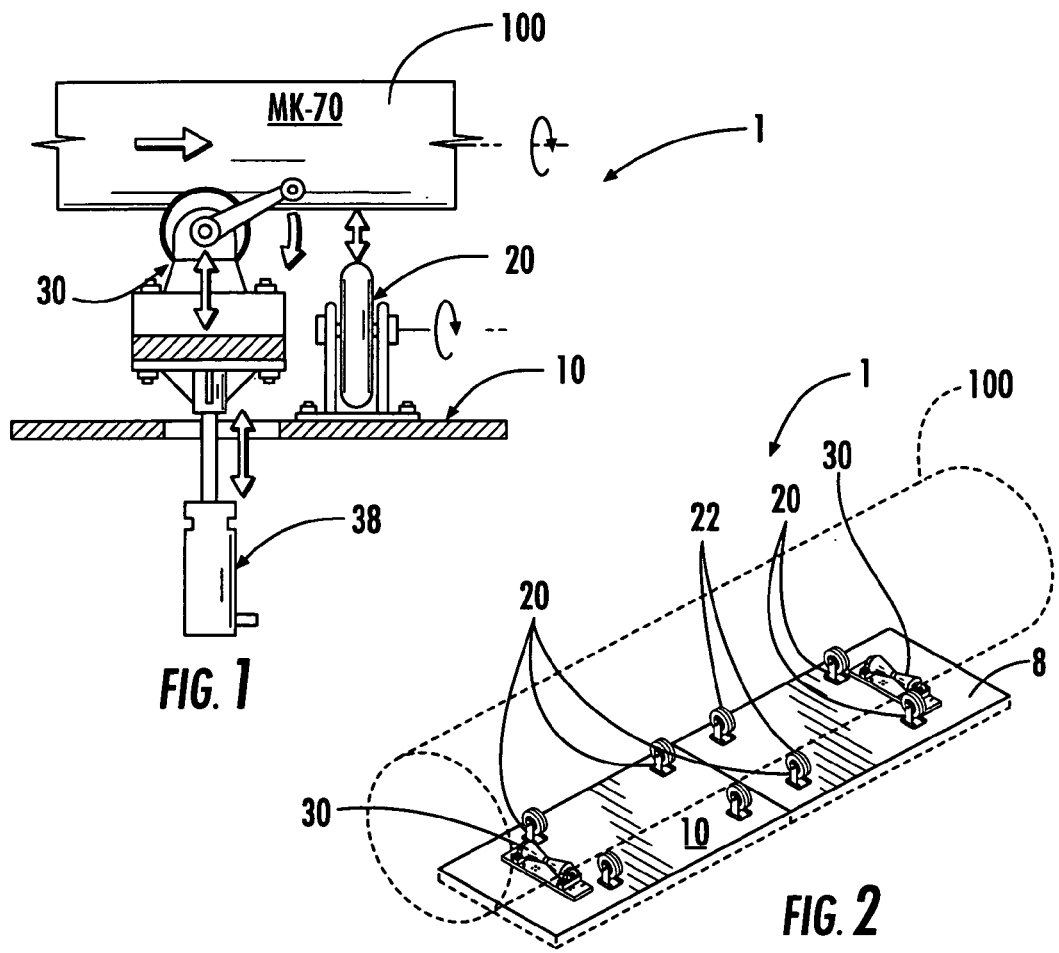
FIG. 1
FIG. 2
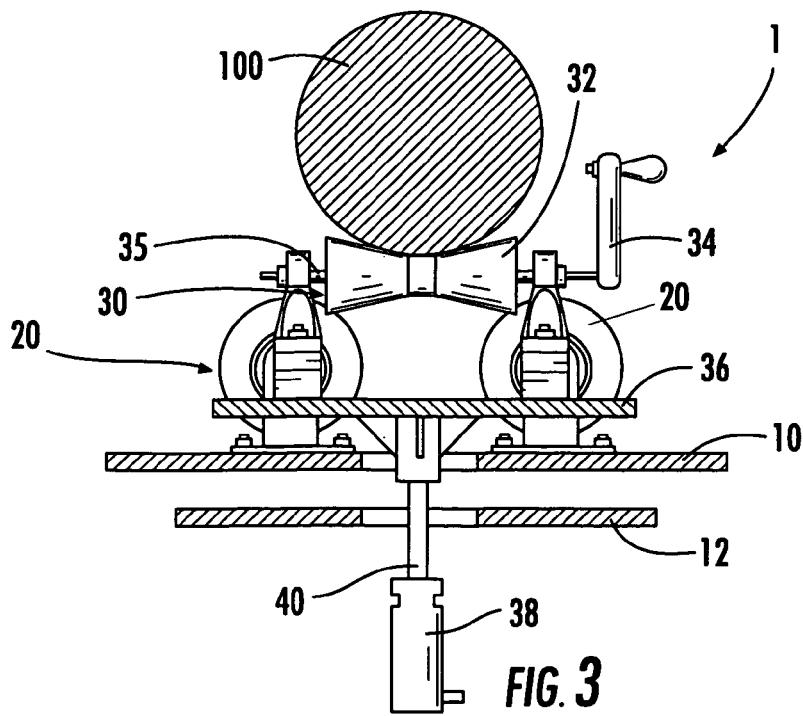
FIG. 3

MULTI-AXIS CYLINDER MANIPULATOR

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates generally to a conveying apparatus, and more particularly to a cart that enables both rotating a cylinder about its center axis and translating the cylinder linearly along the same axis.

2. Prior Art

Carts used to convey objects that are to be X-rayed, where the object is typically cylindrical in shape, have a mechanism that allows the object to be rotated, but require that the object be repositioned several times to obtain a complete set of X-rays, where there are no areas obstructed by the cart. In the case of rockets, the rocket requires linear translation in order to perform X-ray scans free of obstructed areas created by the rotational rollers. Scanning the rocket also requires it to be scanned sequentially from forward to aft, and this process requires multiple linear translations to complete an entire scan. Currently existing carts do not have a means of linear translation, and therefore an overhead crane is used to reposition the rocket. Repositioning the rocket with a crane is time consuming and cumbersome.

Another consideration is that every time the rocket is picked up there is a finite chance that it may be dropped, which at the least would damage the rocket.

An apparatus and method that eliminates the need for a crane would add safety to the process.

SUMMARY OF THE INVENTION

In an exemplary embodiment, the invention is a single location apparatus and method for both rotating a cylinder about its center axis and translating the cylinder linearly along the same axis. The apparatus can be mounted on a cart, and the cart with the apparatus is suitable for X-raying rockets and other cylindrical objects.

Multi-axis movement is accomplished by two sets of rollers: rotational and translational. The translational roller set is held in a retracted and unengaged position while the cylinder rests on the rotational roller set. Movement about the axis of the rotational roller set is allowed in this position. The translational roller set may, at anytime, be engaged with the cylinder, disengaging the cylinder from the rotational roller set. When this action occurs, movement about the axis of the rotational roller set is not allowed, but translational movement is allowed. Accordingly, the cylinder is moved to the desired position by either pushing on the cylinder or cranking the translational roller. The action may be reversed to once again, allow movement about the axis of the rotational roller set. The process may be repeated as needed. The rollers or the cylinder may be powered by motor or manual device.

BRIEF DESCRIPTION OF THE DRAWINGS

The foregoing invention will become readily apparent by referring to the following detailed description and the appended drawings in which:

FIG. 1 is a side view of a multi-axis cylinder manipulator apparatus;

FIG. 2 is a perspective overhead view of a concept version illustrating the relative position of the translational and rotational rollers;

FIG. 3 is a front view of the multi-axis cylinder manipulator apparatus illustrated in FIG. 1;

DETAILED DESCRIPTION OF THE INVENTION

Figure 4:
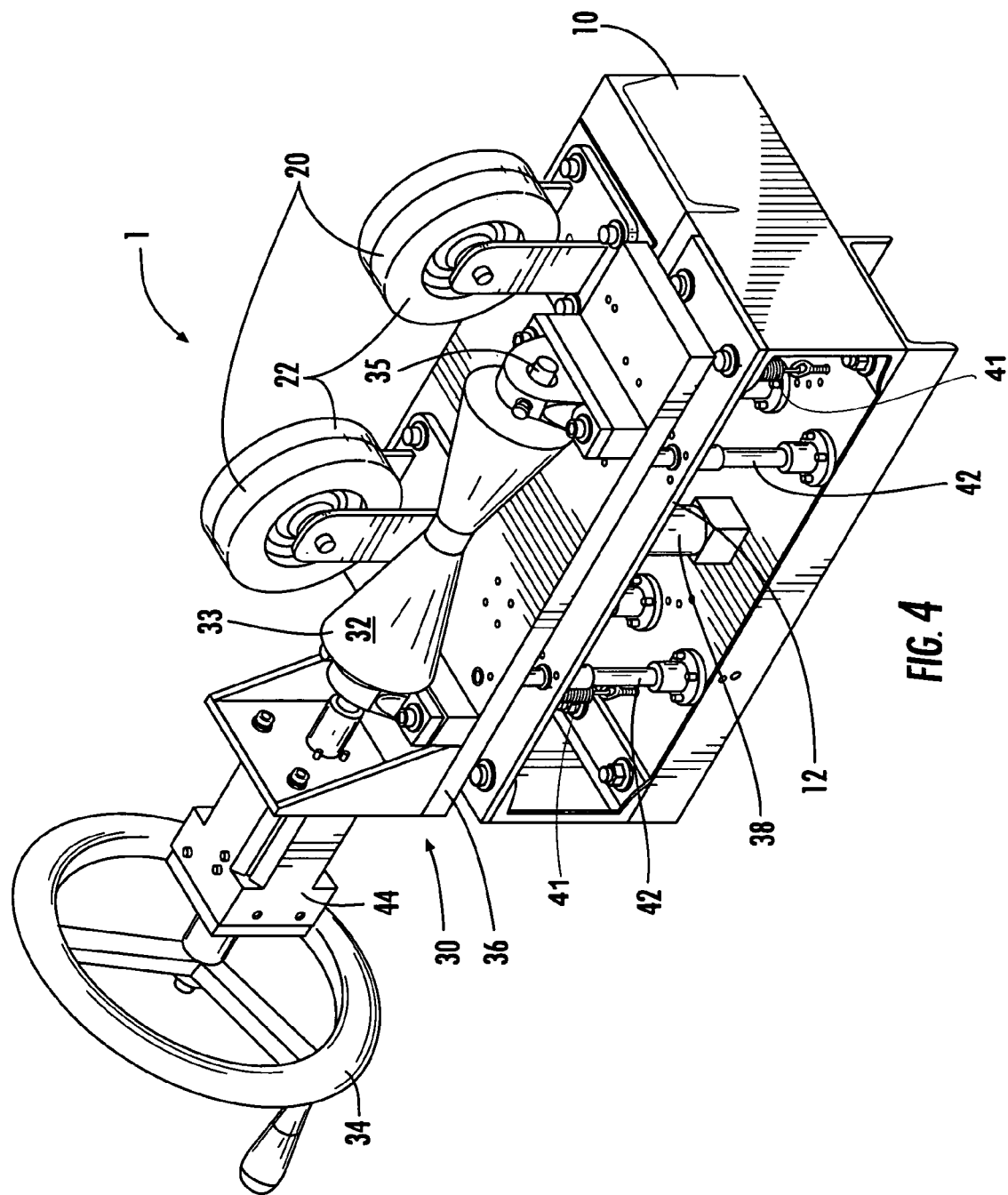
FIG. 4 is a perspective overhead view of the multi-axis cylinder manipulator apparatus, illustrating the translational roller with a geared hand cranked shaft mounted on a movable plate stabilized with a plurality of guide struts that is springedly attached to one or more frame reinforcing elements, and one or more springs that assist to retract, fully, the translational roller after use.

An embodiment of the invention is shown and described in the attached drawings, where the invention includes a multi-axis cylinder manipulator apparatus, a cart or coupled carts forming a unified cart having the invented apparatus, and a method for utilizing the a multi-axis cylinder manipulator apparatus.

Referring to FIGS. 1, 2 and 3, the multi-axis cylinder manipulator apparatus 1 is mounted on a structurally rigid frame 10 having a top-side, a bottom side, and a plurality of lateral sides, where the frame has a length, a width and a thickness, and generally has a plurality of reinforcing elements 12. There is a set of rotational rollers 20 mounted on the top-side of the frame 10, where said rotational rollers have a sufficient hardness durometer, number of rollers, diameter, footprint width, positioning and ease of rotation to non-abrasively support a filled cylinder 100, such as a rocket motor MK-70. The cylinder 100 is held horizontally at a height above the frame 10 of the manipulator apparatus, where the cylinder 100 is axially rotatable with minimal wear or grooving to the cylinder or to the rollers. The rotational rollers 20 have a rotational axis that is parallel to the cylinder's axis of rotational (see FIG. 1). An opposing pair of rotational rollers 22 are spaced widthwise at a distance that is less than the diameter of the cylinder and longitudinally spaced close enough that, cumulatively, the set of rotational rollers 20, 22 provides a plurality of supporting forces, distributed over the cylinder 100, such that rotation is facile. When the cylinder 100 undergoes linear movement, the cylinder does not come into contact with the frame 10 during any normal operation.

A set of translational rollers 30 is on the top-side 8 of the frame 10. The set of translational rollers 30 enables linear movement of the cylinder 100. A translational roller includes a durable self-centering elastic roller 32 on a shaft with an orthogonal axis of rotation. The translational roller is mounted on an upper portion of a movable plate 36 that can be raised with a jack 38 having a hydraulic piston 40 to an elevation sufficient in height that the cylinder 100 clears the translational rollers 30. The members of the set of translational rollers 30 are used substantially simultaneously to elevate the cylinder to a height above the set of rotational rollers. In the elevation position, turning the translational rollers 30 moves the cylinder linearly to a different linear position on the multi-axis cylinder manipulator apparatus 1. At the different linear position; the translational rollers are stopped and lowered, such that the cylinder 100 is supported by the set of rotational rollers 20 and is free to rotate. Process is repeatable until the cylinder has been moved to all the desired linear and rotational positions.

Referring to FIG. 4, which is a perspective overhead view of the multi-axis cylinder manipulator apparatus 1, illustrating the translational roller 30 with a geared hand cranked shaft 35 mounted on a movable plate 36 stabilized with a plurality of guide struts 42. The movable plate 36 is springedly attached to one or more frame reinforcing elements 12.

The translational roller 30 has a durable self-centering rubber roller that includes a pair of opposing, substantially conical portions 33 having a larger diameter and a smaller diameter, where the smaller diameter of the conical portions are proximate, producing a sloped channel for the cylinder, which makes the roll self-centering for the cylinder. The crank 34 is geared down through a gear box 44 to make the roller 30 easier turn. In the illustrated exemplary embodiment, the translational roller 30 is in the lowered position. The movable plate 36 can be raised or lowered through a hydraulic piston 38 in communication with a hydraulic pump 52 and handle 54 (see FIGS. 5 and 6).

Figure 5:
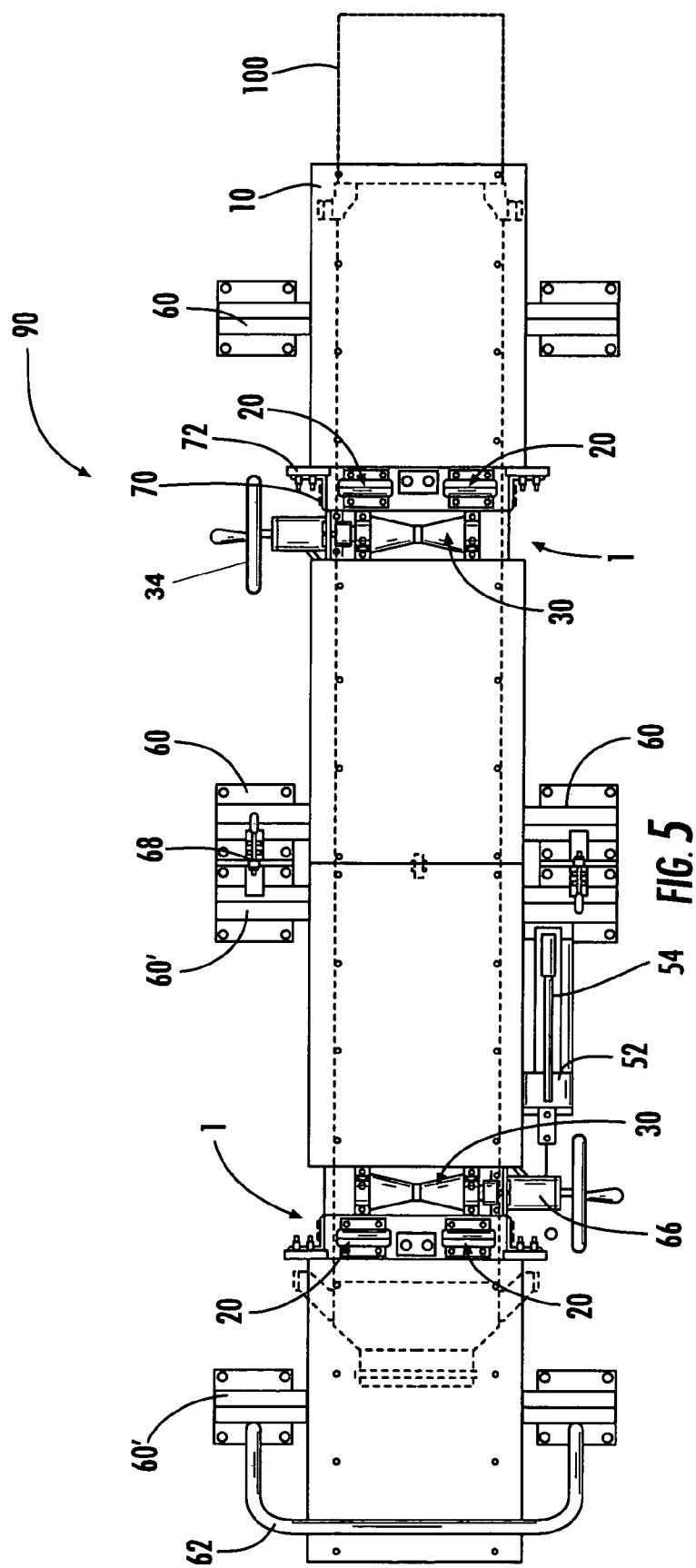
FIG. 5 is an overhead view of a cart fitted with the multi-axis cylinder manipulator apparatus illustrated in FIG. 4, where the cylinder 100 is shown in ghost.
Figure 6:
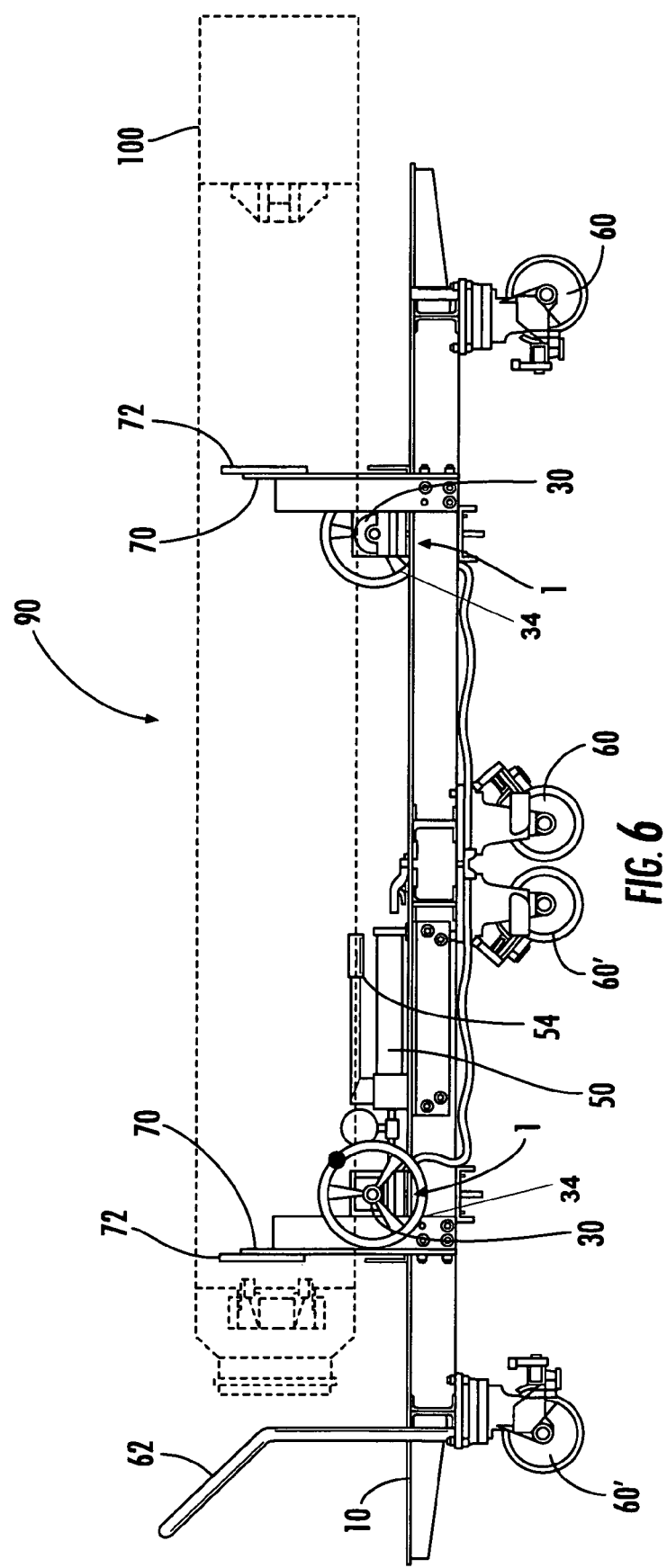
FIG. 6 is a side view of the cart in FIG. 5.

Referring to FIGS. 5 and 6, the multi-axis cylinder manipulator apparatus 1 and a moveable platform are integrally combined as a multi-axis cylinder manipulator cart 90. The multi-axis cylinder manipulator cart 90 includes: a structurally rigid frame 10 having a top-side, a bottom side, and a plurality of lateral sides, where the frame has a length, a width, a thickness, and a plurality of reinforcing elements. A set of rotational rollers 20 (see FIG. 2) is mounted on the top-side of the frame. They have a sufficient hardness durometer, number of rollers, diameter, footprint width, positioning and ease of rotation to non-abrasively support a filled cylinder 100 held horizontally at a height above the frame 10 of the manipulator cart 90. The cylinder 100 (shown in ghost) is axially rotatable with minimal wear or grooving to the cylinder or to the rollers. The rotational rollers 20, (as shown in detail in FIG. 1) have a rotational axis that is parallel to the cylinder's axis of rotational, where an opposing pair of rotational rollers 22 (as shown in detail in FIG. 4) are spaced widthwise at a distance that is less than the diameter of the cylinder and longitudinally spaced close enough that, cumulatively, the set of rotational rollers provides a plurality of supporting forces, distributed over the cylinder.

Rotation is facile, and can for most cylinders be effected manually. The rotational roller are sufficient in number that even when the cylinder is being loaded, unloaded or repositioned linearly, the cylinder does not come into contact with the frame during any normal operation. A set of translational rollers 30 (see FIG. 2) is on the top-side of the frame 10. The set of translational rollers enables linear movement of the cylinder. The illustrated translational roller is a durable self-centering elastic roller on a shaft 35 (as shown in detail in FIG. 4) with an orthogonal axis of rotation. The translational roller is mounted on an upper portion of a movable plate 36 (see FIG. 3) that can be raised to an elevation sufficient in height that the cylinder clears the rotational rollers.

The set of translational rollers are used substantially in tandem to elevate the cylinder to a height above the set of rotational rollers. In the elevated position the translational rollers can be turned (e.g.; rotated) to transpose the cylinder linearly to a desired position on the cart. At the desired position the translational rollers is stopped therein stopping the cylinder at the desired position, where they are normally lowered, such that the cylinder is again supported by the set of rotational rollers and is free to be rotated. The cart has a set of repositioning elements on the bottom side of the frame, where the repositioning elements 60, 60' facilitate movement of the cart, either loaded with a cylinder or unloaded. The cart is generally moved for storage but never while loaded with a rocket for safety reasons.

The set of repositioning elements is selected from the group consisting of casters, skids, bearings, tracks, wheels, air floatation devices, rail wheels, and the like. Heavy duty casters have been found to be suitable for concrete floors.

In FIG. 6, the cart may also include stanchions 70 that emanate upward from the frame. The stanchions help align the cylinder 100 with the set of translational rollers and the rotational rollers. The stanchions exist to guide a rocket or during initial placement on cart via an overhead crane. As a side benefit, the stanchions would also restrain the cylinder if the cart is moved. The stanchions 70 have a bumper 72 of an elastic material.

The illustrated cart has at lease one handle 62 for pushing or pulling the cart. Translation and rotation can be augmented with a motor 66 or sometimes referred to as a gear reduction box 66, as, in an exemplary embodiment, the related drive system is a hand driven wheel involving a crank handle.

In one exemplary embodiment, the frame has coupling elements 68 for joining one multi-axis cylinder manipulator cart to another multi-axis cylinder manipulator cart. For operation of the translational roller, the carts must be joined with a minimum of two translational rollers required per setup. The two halves improve both storage efficiency and ease of transportation in/out of storage. The numbers 60 and 60' indicate a coupled pair of carts, where the repositioning elements 60 and 60' are similar, just on different portions of the unified cart.

Potentially, more carts could be employed to provide a higher aspect cart having longer linear movement. The higher aspect cart has a plurality of multi-axis cylinder manipulator smaller carts that are joined.

illustrated invention is excellent for taking x-rays of rocket motors, such as a MK-70 rocket motor. The entire length of the rocket may be x-rayed in three (3) different rotational positions. The MK-70 rocket motor is small enough that using the disclosed manipulator, it may be manually handled for both rotation and linear translation. The rotational rollers are turned by-hand using the rocket's motor case as a gripping surface. The linear rollers are also turned by-hand, but utilize a 20:1 gear reducer 44 (see FIG. 4), and a 12 inch diameter hand crank 34. For packaging reasons, the linear/translational roller is required to be made smaller than the rotation rollers. This exemplary configuration decreases the mechanical advantage and to activate the roller, requires the mechanical advantage of the gear reduction box 66, including the related drive system. The crank handle and gear reducer decrease the input force required to an ergonomically acceptable level. The engaging mechanism for the current use of the invention utilizes a hydraulic cylinder jack and respective return springs 41. The jack 38 is engaged by use of a hand pump.

Certain features disclosed in the embodiment have a dimensional relationship to the cylinder diameter, allowing for adaptation of the invention to any size cylinder. Some or all of the rollers as well as the engaging actuator (hydraulic jack in the current implementation) may be driven by a motor force. The motor driven invention could be utilized by automated through computer control.

The method for X-raying a rocket motor includes the steps of providing a multi-axis cylinder manipulator cart; positioning translational rollers in an elevated first linear position; loading the rocket; lowering the translational rollers; rotating the rocket on rotational rollers to a first X-ray position; X-raying the rocket; elevating the translational rollers; moving the rocket linearly to a second linear position; elevating the translational rollers; rotating the rocket to a second X-ray position; and repeating the linear and rotation positioning as necessary to complete the X-ray. The rocket is loaded using a crane. The positioning can be done manually or automated.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A multi-axis cylinder manipulator apparatus, comprising:
    a structurally rigid frame having a top-side, a bottom side, and a plurality of lateral sides, where said frame has a length, a width and a thickness, and a plurality of reinforcing elements;
    a set of rotational rollers mounted on the top-side of the frame, where said rotational rollers have a sufficient hardness durometer, number of rollers, diameter, footprint width, positioning and ease of rotation to nonabrasively support a filled cylinder held horizontally at a height above the frame of the manipulator apparatus, where the cylinder is axially rotatable with at least one of minimal wear and grooving to at least one of the cylinder and the rollers, where said rotational rollers have a rotational axis parallel to the cylinder's axis of rotation, where an opposing pair of rotational rollers are spaced widthwise at a distance that is less than a diameter of the cylinder and longitudinally spaced close enough that, cumulatively, the set of rotational rollers provides a plurality of supporting forces, distributed over the cylinder, that rotation is facile, even when the cylinder undergoes linear movement and close enough that the cylinder does not come into contact with the frame during any normal operation; and
    a set of translational rollers on the top-side of the frame, where said set of translational rollers enables linear movement of the cylinder, where a translational roller comprises a durable self-centering elastic roller on a geared shaft with an orthogonal axis of rotation, where each of said translational rollers is mounted on an upper portion of a movable plate that can be raised to an elevation sufficient in height that the cylinder clears the rotational rollers, wherein the set of translational rollers are used in substantially in tandem to elevate the cylinder to a height above the set of rotational rollers, where turning the translational rollers moves the cylinder linearly to a different position on the multi-axis cylinder manipulator apparatus, and at the different linear position the set of translational rollers is stopped and lowered, such that the cylinder is supported by the set of rotational rollers and is free to be rotated.

2. A multi-axis cylinder manipulator cart, said cart comprising:
    a structurally rigid frame having a top-side, a bottom side, and a plurality of lateral sides, where said frame comprises a plurality of reinforcing elements;
    a set of rotational rollers mounted on the top-side of the frame, where said rotational rollers nonabrasively support a filled cylinder held horizontally at a height above the frame of the manipulator cart, where the cylinder is axially rotatable with at least one of minimal wear and grooving to at least one of the cylinder and the rollers, where said rotational rollers have a rotational axis that is parallel to the cylinder's axis of rotational, where an opposing pair of rotational rollers are spaced widthwise at a distance that is less than a diameter of the cylinder and longitudinally spaced close enough that, cumulatively, the set of rotational rollers provides a plurality of supporting forces, distributed over the cylinder even when the cylinder undergoes linear movement and close enough that the cylinder does not come into contact with the frame during any normal operation;
    a set of translational rollers on the top-side of the frame, where a translational roller of said set of translational rollers comprises a durable self-centering elastic roller on a shaft with an orthogonal axis of rotation, where said translational roller is mounted on an upper portion of a movable plate raisable to an elevation sufficient in height that the cylinder clears the rotational rollers translational roller, wherein the set of translational rollers are used in substantially in tandem to elevate the cylinder to a height above the set of rotational rollers, where turning the translational rollers moves the cylinder linearly to a different position on the multi-axis cylinder manipulator cart, and at the different linear position the set of translational rollers is stopped and lowered, such that the cylinder is supported by the set of rotational rollers and is free to be rotated; and
    a set of repositioning elements on the bottom side of the frame for facilitating movement of the cart.

3. The cart according to claim 2, further comprising stanchions emanating upward from the frame, said stanchions assist with alignment of the cylinder when said cylinder is loaded on the cart.

4. The cart according to claim 3, wherein the stanchions have a bumper of an elastic material.

5. The cart according to claim 2, wherein said durable self-centering rubber roller comprises a pair of opposing, substantially conical portions having a larger diameter and a smaller diameter, where the smaller diameter of the conical portions are closer together, producing a sloped channel for the cylinder, said sloped channel being self-centering.

6. The cart according to claim 2, wherein said set of repositioning elements is selected from the group consisting of casters, skids, bearings, tracks, wheels, air floatation devices, and rail wheels.

7. The cart according to claim 2, wherein said movable plate is positioned above at least one of the plurality reinforcing elements, and at least one of raised and lowered through a hydraulic piston in communication with a hydraulic pump, where said movable plate is stabilized with a plurality of guide struts.

8. The cart according to claim 7, wherein said movable plate is springedly attached to above at least one of the plurality reinforcing elements.

9. The cart according to claim 7, wherein the hydraulic piston is in fluid communication with the set of translational rollers, where the set of translational rollers move in one of an up direction and a down direction, substantially simultaneously.

10. The cart according to claim 2, wherein the shaft is in connection with a gear assembly, said gear assembly is in connection with one of a mechanized device and a manual drive device.

11. The cart according to claim 2, wherein the set of rotational rollers enable a cylinder to be rotated manually.

12. The cart according to claim 2, wherein said frame has at lease one handle for one of pushing and pulling the cart.

13. The cart according to claim 2, wherein the set of repositioning elements is comprised of heavy duty casters.

14. The cart according to claim 2, wherein rotation is augmented by a motor.

15. The cart according to claim 2, wherein said frame has coupling elements that join one multi-axis cylinder manipulator cart to another second multi-axis cylinder manipulator cart to provide a higher aspect cart having longer linear movement.

16. The cart according to claim 15, wherein said higher aspect cart is comprised of a plurality of multi-axis cylinder manipulator smaller carts that are joined.

17. A method for X-raying a rocket motor, comprising:
providing a multi-axis cylinder manipulator cart;
positioning translational rollers in an elevated first linear position;
loading the rocket;
lowering the translational rollers and the rocket on rotational rollers;
rotating the rocket on rotational rollers to a first X-ray position;
X-raying the rocket;
elevating the translational rollers;
moving the rocket linearly to a second linear position;
elevating the translational rollers;
rotating the rocket to a second X-ray position; and
repeating the linear and rotation positioning as necessary to complete the X-ray.

18. The method according to claim 17, wherein loading the rocket is done with a crane.

19. The method according to claim 17, wherein positioning is done manually.

20. The method according to claim 17, wherein positioning is automated.

21. A multi-axis cylinder manipulator apparatus, comprising:
a structurally rigid frame having a top-side, a bottom side, and a plurality of lateral sides;
a set of rotational rollers being mounted on the top-side of the frame, where said rotational rollers non-abrasively support a filled cylinder held horizontally at a height above the frame of the manipulator apparatus, where the cylinder is axially rotatable, where said rotational rollers have a rotational axis that is parallel to the cylinder's axis of rotational, where an opposing pair of rotational rollers are spaced widthwise at a distance that is less than the diameter of the cylinder and longitudinally spaced close enough that, cumulatively, the set of rotational rollers provides a plurality of supporting forces, distributed over the cylinder; and
a set of translational rollers on the top-side of the frame for enabling linear movement of the cylinder, where a translational roller comprises a durable self-centering elastic roller on a geared shaft with an orthogonal axis of rotation, where each of said set of translational rollers is mounted on an upper portion of a movable plate raisable to an elevation sufficient in height that the cylinder clears the rotational rollers translational roller, where a turning motion of the translational rollers moves the cylinder linearly to a different position on the multi-axis cylinder manipulator apparatus.

* * * * *